(12) United States Patent
Takeuchi et al.

(10) Patent No.: US 7,565,143 B2
(45) Date of Patent: Jul. 21, 2009

(54) WIRELESS CLIENT DEVICE

(75) Inventors: Tomotaka Takeuchi, Osaka (JP);
Masaaki Higashida, Osaka (JP);
Toshihiro Ezaki, Osaka (JP); Yasuaki Sakanishi, Osaka (JP)

(73) Assignee: Panasonic Corporation, Osaka (JP)

( * ) Notice: Subject to any disclaimer, the term of this patent is extended or adjusted under 35 U.S.C. 154(b) by 490 days.

(21) Appl. No.: 11/390,117

(22) Filed: Mar. 28, 2006

(65) Prior Publication Data
US 2007/0217622 A1    Sep. 20, 2007

(30) Foreign Application Priority Data
Mar. 15, 2006    (JP)    ............... 2006-070754

(51) Int. Cl.
*H04W 4/00*    (2009.01)
(52) U.S. Cl. .................... 455/431; 455/67.13
(58) Field of Classification Search .............. 455/431,
455/11.1, 98, 3.06, 427, 41.2, 550.1, 556.2,
455/73, 517
See application file for complete search history.

(56) References Cited

U.S. PATENT DOCUMENTS

| | | | |
|---|---|---|---|
| 4,428,078 A * | 1/1984 | Kuo | 455/3.06 |
| 4,993,244 A * | 2/1991 | Osman | 70/30 |
| 6,542,758 B1 * | 4/2003 | Chennakeshu et al. | 455/569.2 |
| 7,280,825 B2 * | 10/2007 | Keen et al. | 455/431 |

FOREIGN PATENT DOCUMENTS

| | | |
|---|---|---|
| DE | 3719105 | 12/1988 |
| JP | 3-70220 | 3/1991 |
| JP | 6-13960 | 1/1994 |
| WO | 03/032503 | 4/2003 |

OTHER PUBLICATIONS

Arogyaswami J. Paulraj et al., "An Overview of MIMO Communications-A Key to Gigabit Wireless" IEEE, Feb. 2004, vol. 92, No. 2, pp. 198-218.

* cited by examiner

*Primary Examiner*—Charles N Appiah
*Assistant Examiner*—Joy K Contee
(74) *Attorney, Agent, or Firm*—Wenderoth, Lind & Ponack, L.L.P.

(57) ABSTRACT

Because wired connections make changing the seating configuration difficult, a wireless client device enables stable wireless transmission. The wireless client device wirelessly transmits to and receives data signals from an access point inside an aircraft. The wireless client device has a seat unit with a seat portion on which aircraft passengers sit, an antenna for sending and receiving the data signals, a signal processing arrangement operable to handle data signal receiving and transmitting processes, and a signal output arrangement operable to output processed reception signals. The antenna arrangement, signal processing arrangement, and signal output arrangement are disposed to the seat unit.

19 Claims, 5 Drawing Sheets

WIRELESS CLIENT DEVICE

BACKGROUND OF THE INVENTION

1. Field of technology

The present invention relates to technology for stably wirelessly transmitting large amounts of data in an airplane or other type of aircraft.

2. Description of Related Art

In-flight entertainment ("IFE") systems used in passenger planes in recent years have helped make long-distance flights more enjoyable by providing passengers with in-flight entertainment services such as movies, audio programming, games, and even Internet browsing. The movies, audio programming, Internet data, and other information accessible by these systems are typically stored in an on-board server, and delivered from the server by coaxial cable, optical fiber, or other wired medium as either analog or digital transmissions. IFE equipment generally includes a ceiling-mounted projector and an LCD or other type of video monitor, as well as compact, individual monitors and controllers (handsets) installed at individual passenger seats.

The main transmission cable from the server is generally located in the ceiling, and other ceiling-mounted devices are connected by trunk lines from the main cable. In order to connect to devices located in the floor-mounted seats, large numbers of relay cables are wired through the side walls of the aircraft. Because maximizing the operating rate of high cost airplanes is a major concern for airline companies, airlines frequently change the routes on which aircraft are used and the ticket class configuration of the planes. This necessitates changing the seat positions, which is preferably done in a short time and at low cost. However, because changing the seating configuration means that the relay lines in the side walls must also be changed, changing the seating arrangement takes a long time and is thus expensive. There is, therefore, a need to change from a wired to a wireless transmission medium.

Various technologies for stabilizing wireless transmission have been proposed. In reference patent 1, the antennae of a fixed base station are disposed at positions selected based on the height of each group of RF interference objects that are separated into groups. By appropriately positioning the antennae, the space inside a building or facility can be used effectively and diversity reception, which is effective for broadband transmissions, can be achieved.

In order to afford comprehensive diversity communication with mobile terminals using antenna at two different positions in the fixed base station in a building or facility, reference patent 2 teaches disposing the two antennae so that at least one antenna is substantially parallel to the short side of the wireless service zone being used in order to achieve good diversity reception.

Reference patent 1: Japanese Unexamined Patent Appl. Pub. H03-70220

Reference patent 2: Japanese Unexamined Patent Appl. Pub. H06-13960

Transmitting primarily video information to individual seats inside an aircraft requires significant bandwidth. If a broadcast system that transmits the same content simultaneously to each seat is used and the video signal is sent to each seat at a 5 megabit/second bitrate, the transmission path only requires the same 5 Mb/sec transmission capacity. However, if an on-demand unicast system enabling each user to receive content as desired is used, a transmission path with a capacity exceeding 1 Gb/second must be provided for each of several hundred seats. While the transmission load on the relay lines is not as great as the main trunk line, each relay line supplies anywhere from several to several ten seats and a transmission capacity of from several ten to several 100 megabits/second is therefore required.

Converting this wired system to a wireless system requires building a system that can assure a transmission capacity between several ten to several 100 megabits/second. The technologies taught in reference patents 1 and 2, however, are directed to carrying voice and data traffic within a building or facility and are not suited to the large transmission capacity needed to carry video.

The quality of the content delivered to passengers in an in-flight entertainment system must also be comparable to the playback quality of packaged media, and cannot be jumpy or interrupted. The inside of an airplane is also a difficult environment for enabling stable wireless transmission because the aircraft is populated by several hundred seats and the seating configuration can change frequently. When transmitting only audio and data as described in reference patents 1 and 2 a certain amount of signal degradation is permissible not only for data signals but also audio. As a result, the technologies taught in reference patents 1 and 2 cannot be used to wirelessly transmit high capacity video signals in an in-flight entertainment system with the high quality and stability that are required.

SUMMARY OF THE INVENTION

The present invention is directed to solving this problem, and an object of the invention is to enable high capacity wireless transmission inside an aircraft with high quality and stability.

To achieve this object, a wireless client device according to the present invention is a device for wirelessly transmitting and receiving data signals from access points inside an aircraft. This wireless client device has a seat unit with a seat portion, an antenna arrangement operable to transmit and receive the data signals, a signal processing arrangement operable to process the received data signals and the data signals to be transmitted, and a signal output arrangement operable to output the received and processed data signals, and the antenna arrangement, the signal processing arrangement, and the signal output arrangement are disposed to the seat unit.

The wireless client device of the present invention enables wirelessly transmitting data signals to each seat. As a result, changing the wiring is not necessary when the seating configuration is changed, the seating configuration can therefore be changed in a short time, the operating rate of the aircraft can be improved, and the cost of changing the seating configuration is reduced. Furthermore, by disposing a wireless shield unit in the seat portion and disposing the antenna below the seat portion, MIMO decoding in an environment dominated by indirect waves is possible. As a result, signals can be stably received in the congested environment inside an airplane that is relatively hostile to wireless communication, and high quality video programming can therefore be provided without interruption.

DETAILED DESCRIPTION OF THE PREFERRED EMBODIMENTS

Figure 1:
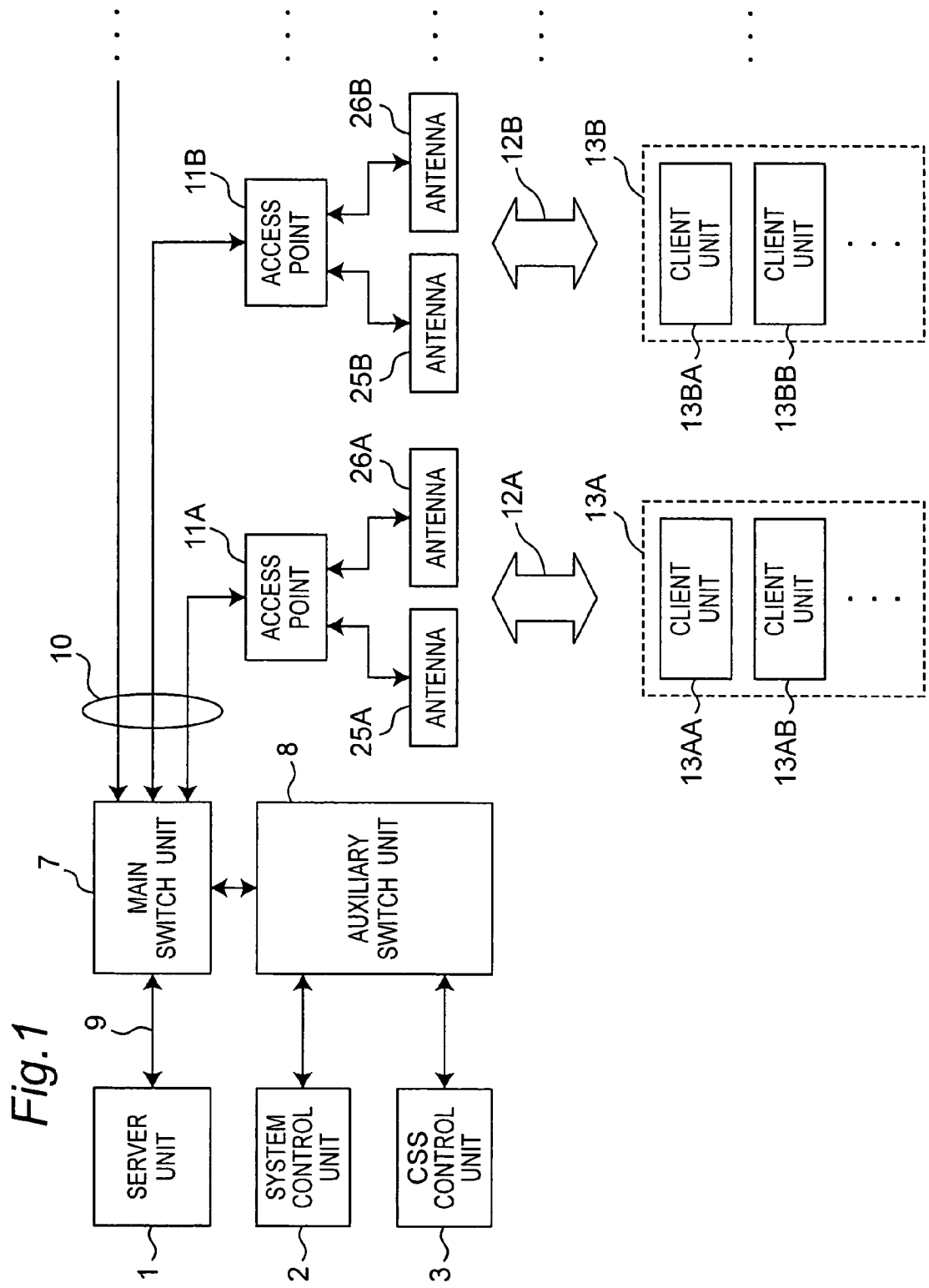
FIG. 1 is a block diagram showing the general arrangement of the first embodiment of the invention.

Preferred embodiments of the present invention are described below with reference to the accompanying figures. Elements having effectively the same arrangement, operation, and effect are identified by the same reference numerals in the figures. In addition, numeric values cited in the following description are used to describe the invention specifically by way of example, and the invention is not limited to these values.

First Embodiment

FIG. 1 is a block diagram showing the general arrangement of the first embodiment of the invention. This first embodiment of the invention is installed inside an aircraft. The aircraft may be an airplane with jet engines or propellers, for example, a helicopter, a hovercraft, a balloon tethered to the ground, a rocket, a man-made satellite, a space station, or any other type of craft that can remain aloft at a predetermined distance or more from the Earth's surface for at least a predetermined period of time. This first embodiment of the invention is described using a passenger plane by way of example only. There may be several hundred passenger seats installed in the airplane, and passengers can enjoy movies, audio programming, games, and Internet browsing by an in-flight entertainment (IFE) system.

Referring to FIG. 1, the server unit 1 includes a hard disk array for storing data signals including at least one of a video signal or an audio signal, and an AV server for reading and outputting data signals from the hard disk array in real-time. The AV server is also called a video server, and includes a computer server and other hardware for improving server performance as may be needed. The server unit 1 is thus built to function as a high-throughput server capable of meeting demand for VOD (video-on-demand) service from several hundred people.

Video signals are MPEG-2 encoded, audio signals are AAC (Advanced Audio Coding) encoded, and the video and audio data is generally stored while the aircraft is parked at an airport.

The server unit 1 also has the functions of a web server and telephone exchange, and thus enables Internet browsing and telecommunication services by making a connection via an antenna to communication satellites or ground-based telecommunication equipment. The server unit 1 thus stores one or more types of data signals including video signals, audio signals, and Internet data signals.

The data signals output from the server unit 1 are distributed by way of connection 9, main switch unit 7, and trunk 10 to each of a predetermined number, such as ten or more, of access points 11A, 11B in the airplane. The access points 11A, 11B are collectively referred to below as access point 11. The connection 9 is a Gigabit Ethernet path so that it can carry massive numbers of data signals. Gigabit Ethernet can be provided using 1000Base-T shielded twisted-pair cable or optical fiber cable for greater resistance to electromagnetic interference over long distances, and the specific type of connection will be determined based on the size of the aircraft, cost, and ease of installation and maintenance.

The main switch unit 7 includes a Layer 3 compatible Gigabit Ethernet switch, and has enough ports and throughput to enable transmitting the data signals to the access points 11 without convergence. For example, because all of the data signals flowing to the ten or more trunks 10 flow through connection 9, the main switch unit 7 is configured so that the input capacity of the main switch unit 7 ports connected to connection 9 is sufficiently high compared with the input/output capacity of the other ports.

An auxiliary switch unit 8 for switching the flow of primarily various control signals is connected to the main switch unit 7. The auxiliary switch unit 8 can be a Gigabit Ethernet switch similarly to the main switch unit 7, but a 100-megabit Ethernet switch is normally sufficient.

The system control unit 2 is connected to the auxiliary switch unit 8. The system control unit 2 comprises one or more computers and in this first embodiment of the invention controls the entire in-flight entertainment system.

The CSS control unit 3 is also connected to the auxiliary switch unit 8 and controls the cabin service system (CSS). The cabin service system enables each passenger to turn the reading light on and off or call the flight attendant to one's seat for service. These services can be rendered as functions of the cabin service system itself or as a part of the functions of the in-flight entertainment system.

Note that the arrangement comprising a system control unit 2, CSS control unit 3, and auxiliary switch unit 8 as shown in FIG. 1 is by way of example only, and the present invention is not limited to this arrangement. For example, this first embodiment of the invention can be arranged with the CSS control unit 3 connected directly to the system control unit 2, or the auxiliary switch unit 8 integrated with the main switch unit 7 with the port functions of the auxiliary switch unit 8 handled by some of the ports in the main switch unit 7, or by using a computer with multiple ports instead of the auxiliary switch unit 8.

Data signals distributed to access point 11A are converted to wireless signals through antennae 25A and 26A, and transmitted as wireless data signal 12A to each client unit 13AA, 13AB in wireless zone 13A. The wireless access system in this first embodiment of the invention uses 2-input, 2-output MIMO (multi-input, multi-output) encoding and OFDM (orthogonal frequency division multiplex) encoding. The access point 11A therefore MIMO-OFDM encodes the data signal, and outputs the MIMO-OFDM encoded wireless data signal 12A through antennae 25A and 26A. MIMO-OFDM encoding includes error correction coding, MIMO encoding, and OFDM encoding. A wireless zone 13A represents the area in which wireless communication with access point 11A operates effectively. One wireless channel is assigned to each wireless zone. The client units 13AA, 13AB are disposed one set per seat or per multiple seats in the airplane.

Wireless communication between access point 11A and each client unit 13AA, 13AB flows in both directions, up and down. Transmission from access point 11A to client units 13AA, 13AB is down, and transmission from the client units 13AA, 13AB to access point 11A is up. Access point 11A transmits wireless signals during down transmissions, and receives the wireless signals during up transmissions. Access point 11B and the other access points, wireless zone 13B and the other wireless zones, and client units 13BA, 13BB and other client units operate in the same way as described above, and further description thereof is omitted here.

Figure 2:
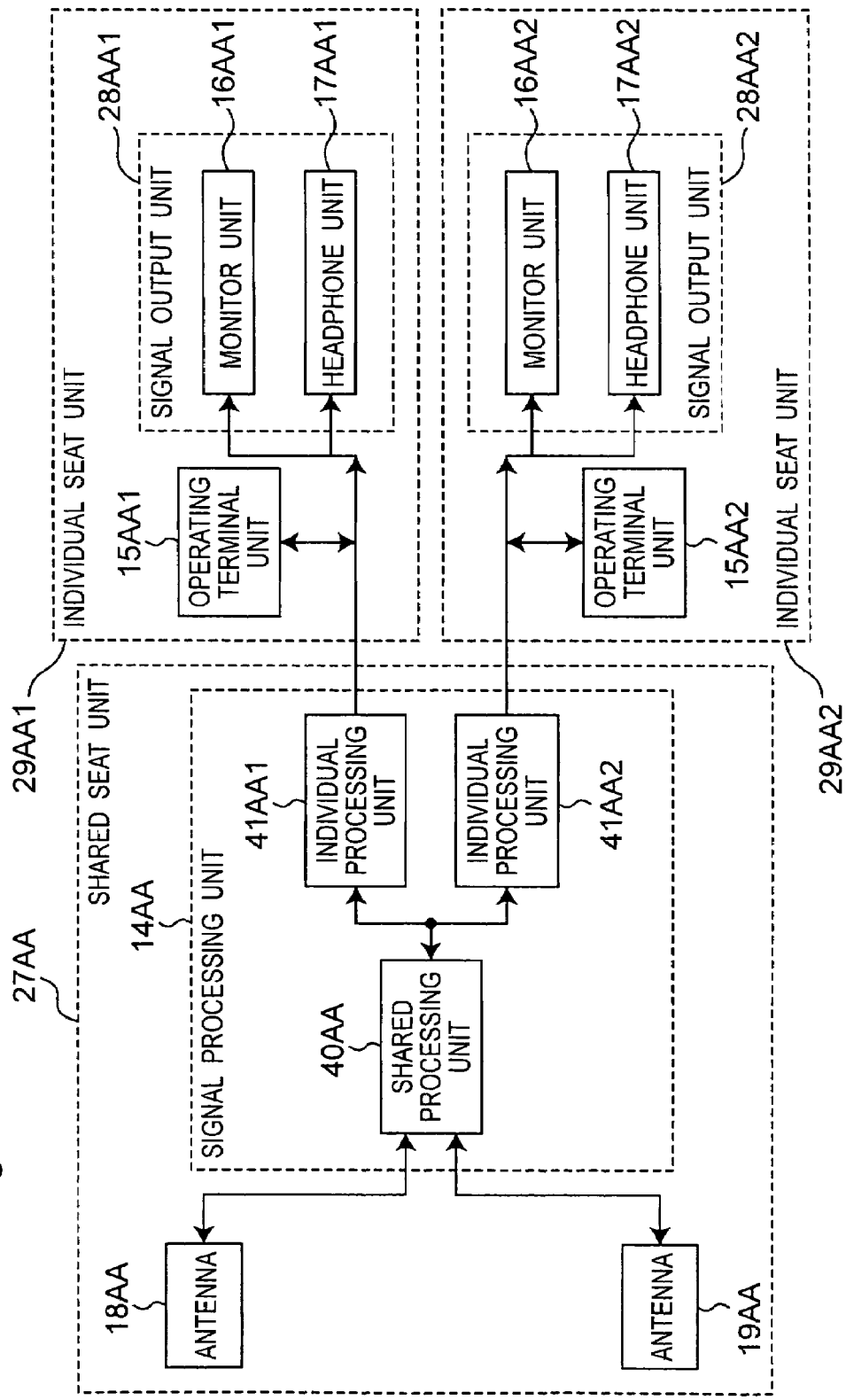
FIG. 2 is a detailed block diagram showing the arrangement of a client unit in the first embodiment of the invention.

FIG. 2 is a detailed block diagram showing the arrangement of a client unit 13AA in the first embodiment of the invention. The client unit 13AA includes one shared seat unit 27AA and one or a plurality of individual seat units. One shared seat unit 27AA is disposed for a plurality of seats, and an individual seat unit is provided for each seat. Two individual seat units 29AA1 and 29AA2 are disposed to one shared seat unit 27AA in this embodiment of the invention.

The shared seat unit 27AA has one or a plurality of antenna units and a signal processing unit 14AA. The antenna unit comprises two antennae 18AA and 19AA. Each signal processing unit 14AA has a shared processing unit 40AA and the same number of individual processing units as individual seat units. The signal processing unit 14AA thus has two individual processing units 41AA1 and 41AA2 in this embodiment of the invention. Individual seat unit 29AA1 comprises operating terminal unit 15AA1 and signal output unit 28AA1. The signal output unit 28AA1 comprises a monitor unit 16AA1 and headphone unit 17AA1. The operating terminal unit 15AA1 is also called a handset or controller. Individual seat unit 29AA2 is identical to individual seat unit 29AA1 and further description thereof is thus omitted.

The wireless data signal 12A is input through antennae 18AA and 19AA to shared processing unit 40AA. The shared processing unit 40AA decodes the MIMO-OFDM encoded wireless data signal 12A, and outputs to the individual processing units 41AA1 and 41AA2. MIMO-OFDM decoding includes OFDM decoding, MIMO decoding, and error correction decoding.

The individual processing units 41AA1 and 41AA2 MPEG-2 decode the compressed video signal and AAC decode the compressed audio signal for the individual seat units 29AA1 and 29AA2 disposed to each seat. The individual seat unit 29AA1 then outputs the decoded video signal and audio signal to the monitor unit 16AA1 and headphone unit 17AA1.

The individual processing units 41AA1 and 41AA2 are contained in the shared seat unit 27AA in this embodiment of the invention, but they could be contained in the individual seat units 29AA1 and 29AA2.

The operating terminal unit 15AA1 comprises switches for the cabin service system, including the reading light switch and flight attendant call switch, and thus sends CSS control signals to the CSS control unit 3 by way of shared seat unit 27AA, access point 11A, trunk 10, main switch unit 7, and auxiliary switch unit 8.

The CSS control unit 3 operates the cabin service system based on the CSS control signals. The operating terminal unit 15AA1 also has an image quality adjustment switch for the monitor unit 16AA1, and sends video adjustment control signals to the monitor unit 16AA1. Based on the video adjustment control signal, the monitor unit 16AA1 can adjust the image quality of the monitor unit 16AA1.

The operating terminal unit 15AA1 also has a data signal channel selection switch and VOD service switch, and can thus send a data control signal to the system control unit 2 by way of shared seat unit 27AA, access point 11A, trunk 10, main switch unit 7, and auxiliary switch unit 8.

The system control unit 2 adjusts the convergence of the VOD service system based on the data control signals received from all seats in the aircraft, and outputs distribution commands to the server unit 1 by way of main switch unit 7 and auxiliary switch unit 8 for the data signals to be output to the client unit 13AA.

The server unit 1 then attaches the address of the client unit 13AA and individual seat unit 29AA1 to the data signal, and outputs the addressed data signal.

If the operating terminal unit 15AA1 also has a keyboard and mouse, for example, the operating terminal unit 15AA1 can also send computer control signals to the server unit 1 by way of the shared seat unit 27AA, access point 11A, trunk 10, and main switch unit 7. Based on the computer control signals, the server unit 1 enables an Internet browsing service for the client unit 13AA.

While the operation of individual seat unit 29AA1 is described above, the other individual seat unit 29AA2 operates in the same way and further description thereof is thus omitted. Furthermore, while the operation of client unit 13AA is described above, the other client units 13AB, 13BA, 13BB are also arranged as shown in FIG. 2, operate in the same way as client unit 13AA, and further description thereof is thus omitted.

Furthermore, the system control unit 2 controls the VOD service system in this first embodiment of the invention, but the server unit 1 could control the VOD service system if the operating terminal unit 15AA1 sends the data control signals to the server unit 1.

Figure 3:
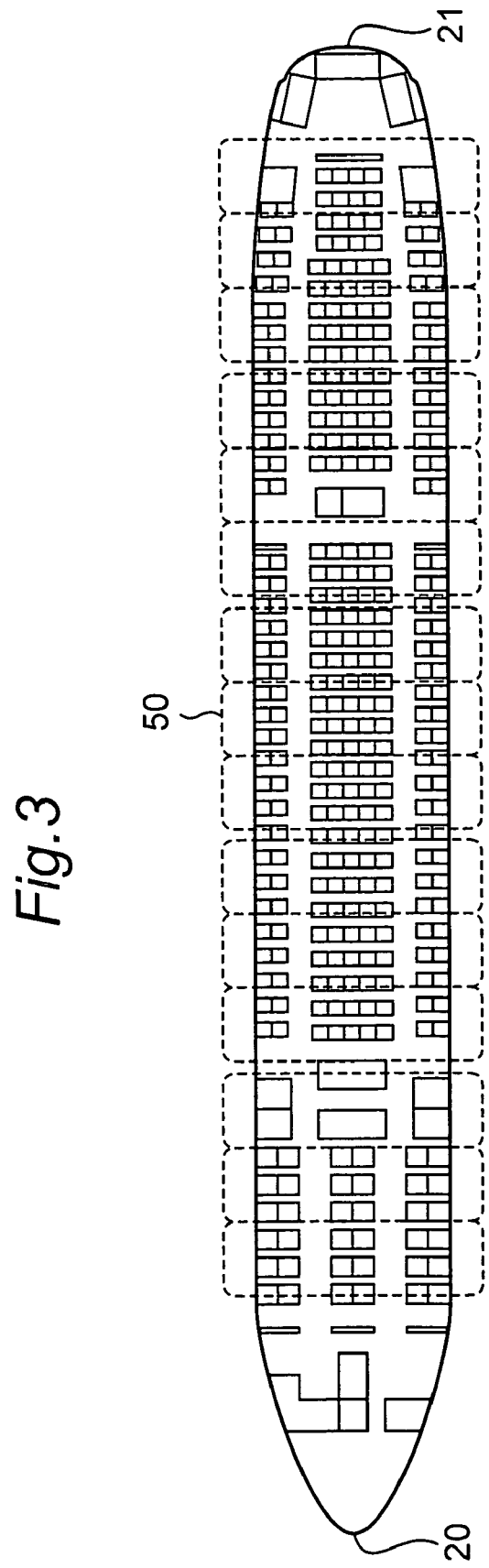
FIG. 3 describes the arrangement of wireless zones in the first embodiment of the invention.

The wireless communication system operating in the 5-GHz band and known as IEEE 802.11a is used for wireless access control in this first embodiment of the invention. FIG. 3 describes the allocation of the wireless channels to the different parts of the aircraft. FIG. 3 is a horizontal section view through the fuselage of the airplane, and is a top plan view showing the seating arrangement with the top of the fuselage removed. One wireless channel is allocated to each wireless zone 50 denoted by a dotted line, and all wireless zones 50 are located between the front 20 and the rear 21 of the aircraft. The directivity of the two antennae connected to each access point is high, and each wireless zone is formed so that the overlap between wireless zones is small, the gap between wireless zones is small, and RF power within each wireless zone is as uniform as possible.

Figure 4A:
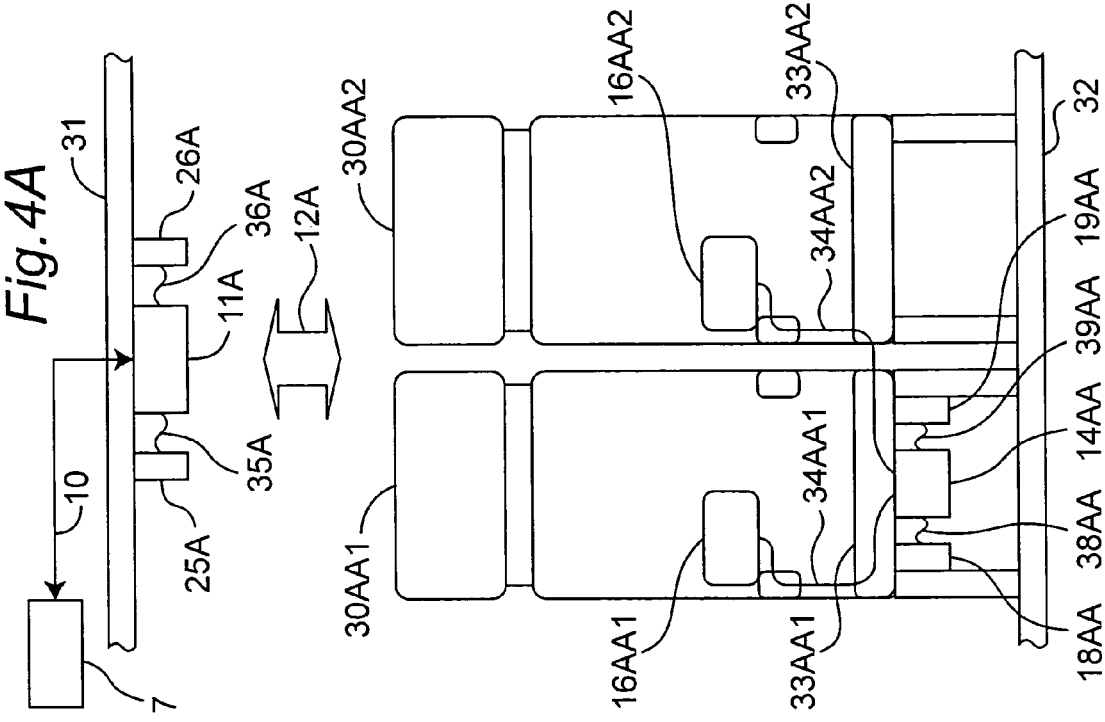
FIG. 4A is a front view showing the arrangement of a wireless client device in the first embodiment of the invention.
Figure 4B:
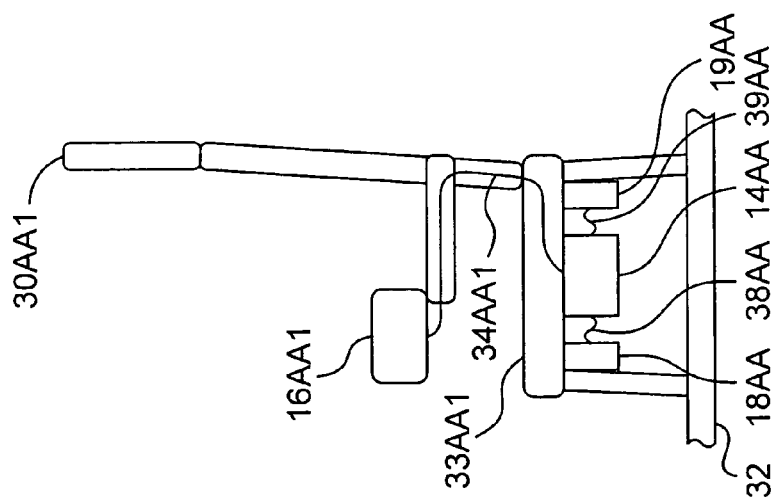
FIG. 4B is a side view showing the arrangement of a wireless client device in the first embodiment of the invention.

FIG. 4A and FIG. 4B schematically show the physical arrangement of the parts shown in the block diagrams in FIG. 1 and FIG. 2. FIG. 4A is a front view and FIG. 4B is a side view.

The trunk 10 connected to the main switch unit 7 is located above, that is, on the back side of, the ceiling panel 31 of the aircraft, and is connected to the access point 11A attached to the bottom side of the ceiling panel 31. The separate wires 35A and 36A connected to the access point 11A are connected to the antennae 25A and 26A disposed to the bottom side of the ceiling panel 31 with a predetermined distance between the antennae 25A and 26A. The wireless data signal 12A from the antennae 25A and 26A forms the wireless zone 13A (see FIG. 1), and seats 30AA1 and 30AA2 are located in wireless zone 13A.

One end of wires 38AA and 39AA is connected to antennae 18AA and 19AA, respectively, which are located below the seat cushion 33AA1 of seat 30AA1, and the other end of wires 38AA and 39AA is connected to signal processing unit 14AA, which is similarly located below the seat cushion 33AA1. Monitor units 16AA1 and 16AA2 are disposed to seats 30AA1 and 30AA2 so that video programming can be viewed at each seat. Other wires 34AA1 and 34AA2 from the signal processing unit 14AA are connected to monitor units 16AA1 and 16AA2, respectively.

The wired connections are completely contained within each unit comprising connected seats 30AA1 and 30AA2, and the seating configuration can be easily changed using these seat units.

As will be understood from the front view in FIG. 4A and the side view in FIG. 4B, the antennae 18AA and 19AA are affixed at diagonally opposite corner parts of the seat cushion 33AA1 so that the distance between the antennae is as great as possible. In the 5-GHz wireless access system used in this first embodiment of the invention, the wavelength of the wireless data signal 12A is 50 mm to 60 mm. This first embodiment of the invention uses 2-input, 2-output MIMO wireless transmission. In order to maximize the transmission capacity in this system, the correlation between multipath fading on the two wireless transmission paths must be minimized. The size of the seat cushion 33AA1 varies according to the ticket class, but is typically approximately 500 mm square with approximately 700 mm between diagonally opposite corners. In the 5-GHz frequency band, the distance between antennae 18AA and 19AA is thus greater than approximately 10 times the wavelength, and antenna correlation is sufficiently low. The predetermined distance between the antenna 25A and 26A is also greater than or equal to the distance between antennae 18AA and 19AA.

Stable wireless transmission by direct waves between the antennae 25AA and 26AA installed to the ceiling panel 31 and the antennae 18AA and 19AA installed in the seats is difficult inside an airplane. One reason is that direct wave transmission requires installing antennae 18AA and 19AA on the top portion of the seats 30AA1 and 30AA2 so that there is a direct line of sight to the ceiling-mounted antennae 25A and 26A, and this is difficult in terms of both design and function. A second reason is that passengers entering and leaving the aisle or walking down the aisle, and luggage carts carried by passengers significantly disrupt direct signals. A third reason is that the inside of an airplane, which is a confined closed space storing a lot of luggage and other materials, is a hostile environment for wireless transmission that produces indirect waves that interfere with direct wave reception. Stable wireless transmission by direct waves is thus difficult inside an airplane.

This first embodiment of the invention thus creates an environment that instead reduces direct wave transmission and increases the transmission of indirect waves that are actively used to enable stable reception.

The antennae 18AA and 19AA are disposed below the seat cushion 33AA1, and could be directly attached to the underside of the seat 33AA1. Alternatively, a housing could be provided attached to at least the underside of the seat part 33AA1 or one of the legs of the seat 30AA1 underneath the seat cushion 33AA1, and the antennae could be located inside this housing. An RF shield material that blocks wireless signals in the 5-GHz is contained in the seat cushion 33AA1. This RF shield material may be aluminum, duralumin, carbon, iron, ferrite, or other metal or metal oxide material. This material can be processed into a powder that is then dispersed inside the seat cushion 33AA1, or it could be formed by coating or vapor deposition into a tape, panel, or cloth form that is then assembled inside or affixed on the bottom surface of or below the seat cushion 33AA1. Alternatively, the antennae 18AA and 19AA and RF shield material may both be disposed inside the seat cushion 33AA1. Irrespective of where the antennae 18AA and 19AA and RF shield material are rendered, the antennae 18AA and 19AA is always disposed below the RF shield. An approximately 30 to 40 dB shield can thus be easily achieved in the 5-GHz frequency band.

As described above with reference to FIG. 3, the directivity of the two antennae 25A and 26A is high in order to improve wireless zone separation. As a result, the RF shield disposed to the seat cushion 33AA1 efficiently blocks transmission of direct waves to the antennae 18AA and 19AA disposed below the seat cushion 33AA1.

As a result, indirect waves of the wireless data signal 12A reaching each antenna 18AA and 19AA have approximately 1000 times the signal power as direct waves. More particularly, the wireless data signal 12A is reflected, scattered, and diffracted by the side walls of the aircraft, the ceiling panel 31, the floor 32, the seats, people sitting in their seats or walking down the aisle, and even the service carts, and thus reach the antennae 18AA and 19AA as indirect waves including reflected waves, scattered waves, and diffraction waves. The waves received by the antennae 18AA and 19AA in such a multipath environment contain significant multipath fading, particularly frequency selection fading. The MIMO-OFDM encoded wireless data signal 12A thus efficiently reproduces the original signal from numerous indirect waves containing different delays and amplitudes and time-based variations. Thus actively using this multipath environment enables a wireless access system that is more stable and durable than receiving direct waves.

By thus wirelessly transmitting data signals to each seat, this first embodiment of the invention enables changing the seating configuration without changing the wiring, and thus enables changing the seating configuration in a short time, improving the operating rate of the aircraft, and reducing the cost of changing the seating configuration. Furthermore, by disposing a wireless shield in the seat portion 33AA1 and disposing the antennae 18AA and 19AA below the seat portion 33AA1, MIMO decoding in an environment dominated by indirect waves is possible. As a result, signals can be stably received in the congested environment inside an airplane that is relatively hostile to wireless communication, and high quality video programming can therefore be provided without interruption.

Only the monitor unit 16AA1 is shown in FIG. 4A and FIG. 4B as the individual seat unit 29AA1, but headphone unit 17AA1 and operating terminal unit 15AA1 are likewise connected to wire 34AA1 and attached to the seat 30AA1. Furthermore, while only one monitor unit 16AA1 is disposed to the seat 30AA1 in this embodiment, there could be two monitor units 16AA1 attached to a seat and there could be seats without an attached monitor unit.

Furthermore, MIMO-OFDM encoded is used to improve the effect of the present invention in this first embodiment, but the same effect can be achieved to a certain degree by using indirect waves with MIMO encoding only or without MIMO encoding.

Yet further, MIMO encoding is 2-input, 2-output encoding this embodiment of the invention, but the wireless transmission capacity can be further improved by increasing the number of multiplexed inputs and outputs.

Second Embodiment

The arrangement of the client unit in this second embodiment of the invention is described with reference primarily to the differences with the first embodiment. Other aspects of the arrangement, operation, and effect of this embodiment are the same as the first embodiment, and further description thereof is omitted.

Figure 5A:
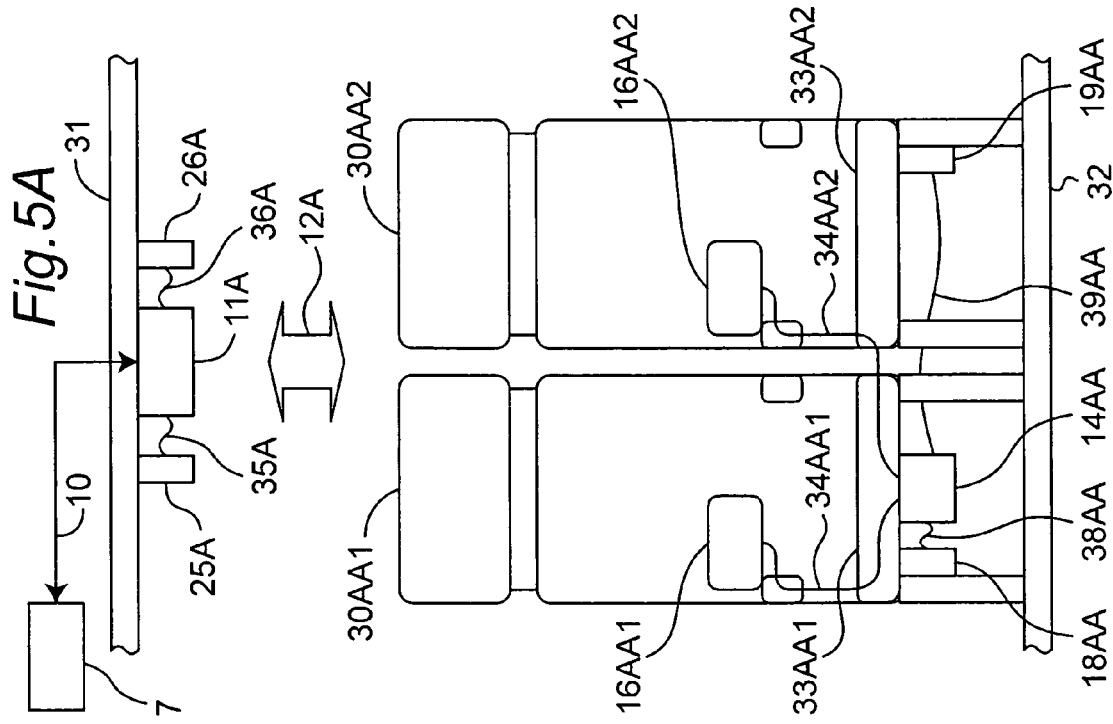
FIG. 5A is a front view showing the arrangement of a wireless client device in the second embodiment of the invention.
Figure 5B:
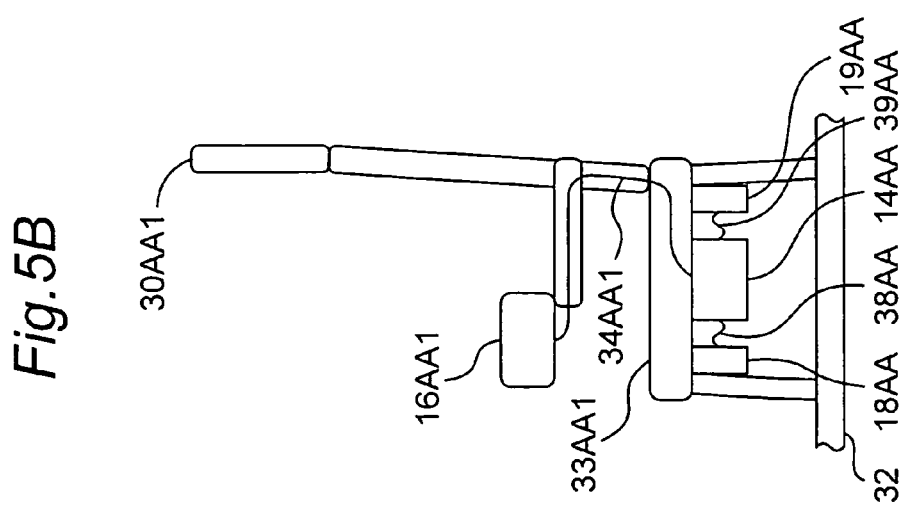
FIG. 5B is a side view showing the arrangement of a wireless client device in the second embodiment of the invention.

FIG. 5A and FIG. 5B schematically show the physical arrangement of the parts shown in the block diagrams in FIG. 1 and FIG. 2 in this second embodiment of the invention. FIG. 5A is a front view and FIG. 5B is a side view. Only the location of antenna 19AA and wire 39AA1 differ from the arrangement shown in FIG. 4A and FIG. 4B, and the configuration of this embodiment is otherwise the same as the first embodiment.

Antennae 18AA and 19AA are installed below the seat cushion 33AA1 and 33AA2 of seats 30AA1 and 30AA2, respectively, and are connected to the signal processing unit 14AA by wire 38AA and wire 39AA. As will be known from the front view in FIG. 5A and the side view in FIG. 5B, antennae 18AA and 19AA are affixed at diagonally opposite corner parts of the seat cushions 33AA1 and 33AA2 so that the distance between the antennae is as great as possible. In the 5-GHz wireless access system used in this second embodiment of the invention, the correlation between multipath fading on the two wireless transmission paths must be minimized in order to maximize the transmission capacity in this system. The size of the seat cushion 33AA1, 33AA2 varies according to the ticket class, but is typically approximately 500 mm square with approximately 1400 mm between diagonally opposite corners of adjacent seats. In the 5-GHz frequency band, the distance between antennae 18AA and 19AA is thus greater than approximately 20 times the wavelength, and antenna correlation is sufficiently low.

The distance between the antennae 18AA and 19AA is thus greater in this second embodiment of the invention than in the first embodiment of the invention, and the correlation between the two wireless data signals sent and received using antennae 18AA and 19AA can be made sufficiently low. As a result, MIMO transmission performance can be further improved.

In another aspect of the invention one signal processing unit 14AA is disposed for a unit of three or more seats. In this arrangement the signal processing unit 14AA is disposed near the center of the three or more seats and the antennae 18AA and 19AA are disposed to the seats on the outside of the unit of three or more seats. This minimizes the distance between the antennae 18AA and 19AA and signal processing unit 14AA. As a result, the SN ratio of weak reception signals can be improved, and electromagnetic interference can be reduced during transmission.

In yet another aspect of the invention one signal processing unit 14AA and three or more antennae are disposed to a unit of three or more seats. In this arrangement the signal processing unit 14AA is disposed near the center of the three or more seats as noted above and the three or more antennae are disposed to so that the antennae are substantially equidistantly spaced. For a unit of five seats in a row, for example, the three antennae are disposed to the two outside seats and the one center seat. This arrangement achieves a low correlation between the three or more wireless data signals sent and received using the three or more antennae, and can thus further improve MIMO transmission performance.

Preferred embodiments of the present invention are described above, but the invention is not limited to these embodiments and can be varied in many ways by one with ordinary skill in the related art using the technology of this invention.

The present invention can be used in a wireless client device.

What is claimed is:

1. A wireless client device for wirelessly transmitting and receiving data signals from access points inside an aircraft, comprising:
   a seat with a seat portion;
   an antenna arrangement operable to transmit and receive the data signals;
   a signal processing arrangement operable to process the received data signals and the data signals to be transmitted; and
   a signal output arrangement operable to output the received and processed data signals;
   wherein the antenna arrangement, the signal processing arrangement, and the signal output arrangement are disposed to the seat portion, and
   an RF shield arrangement is disposed to the seat portion.

2. The wireless client device described in claim 1, wherein the seat blocks direct wireless signals so that direct RF power is less than or equal to indirect wireless signal power.

3. The wireless client device described in claim 1, wherein the antenna arrangement is disposed to the seat portion.

4. The wireless client device described in claim 1, wherein the RF shield arrangement is disposed a lower part of the seat portion.

5. The wireless client device described in claim 1, wherein the antenna arrangement is disposed below the seat portion.

6. The wireless client device described in claim 1, wherein the antenna arrangement is located below the RF shield arrangement.

7. The wireless client device described in claim 1, comprising N of said signal output arrangement where N is an integer of one or more, wherein said signal processing arrangement supplies N channel data signals to said N signal output arrangements.

8. The wireless client device described in claim, comprising M of said seat where M is an integer of one or more, wherein said N signal output arrangements are disposed to said M seats.

9. The wireless client device described in claim 8, wherein the M seats are connected together.

10. The wireless client device described in claim 1, comprising L of said antenna arrangement, wherein said signal processing arrangement transmits and receives L data signals to said L antenna arrangements.

11. The wireless client device described in claim 10, wherein the L data signals are MIMO encoded.

12. The wireless client device described in claim 10, comprising M of said seat where M is an integer of one or more, wherein the L antenna arrangements are disposed to said M seats.

13. The wireless client device described in claim 12, wherein the L antenna arrangements are disposed in the M seats with substantially equal spacing between adjacent antenna arrangements.

14. The wireless client device described in claim 12, wherein L and M are equal and the L antenna arrangements are disposed to M seats respectively.

15. The wireless client device described in claim 12, wherein two antenna arrangements are disposed to outside end seats of the M seats.

16. The wireless client device described in claim 15, wherein two antenna arrangements are disposed to diagonally opposite portions of the M seats.

17. The wireless client device described in claim 12, wherein two antenna arrangements are disposed to diagonally opposite portions of the seat portion of one seat.

18. The wireless client device described in claim 12, wherein the M seats are connected together.

19. The wireless client device described in claim 1, comprising M of said seat where M is an integer of one or more, wherein said signal processing arrangement is disposed to said M seats.

* * * * *